US012682189B1

(12) United States Patent
Loesch et al.

(10) Patent No.: US 12,682,189 B1
(45) Date of Patent: Jul. 14, 2026

(54) SELECTIVE VISUAL DISPLAY BY NEAR-FIELD COMMUNICATION (NFC)

(71) Applicant: Truist Bank, Charlotte, NC (US)

(72) Inventors: Ryan Thomas Loesch, Cumming, GA (US); Muthukumar Gopalakrishnan, Suwanee, GA (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 19/061,439

(22) Filed: Feb. 24, 2025

(51) Int. Cl.
　　*G06K 7/08*　　　(2006.01)
　　*G06K 7/10*　　　(2006.01)
　　*G07C 9/00*　　　(2020.01)

(52) U.S. Cl.
　　CPC ..... *G06K 7/10297* (2013.01); *G07C 9/00182* (2013.01); *G07C 9/00912* (2013.01)

(58) Field of Classification Search
　　CPC .............. G06Q 10/10; G06Q 20/4014; G06K 7/10198; G06K 7/10415; G06K 7/10366; G06K 7/10297
　　USPC ........................................................ 235/451
　　See application file for complete search history.

(56) References Cited

U.S. PATENT DOCUMENTS

| | | | | |
|---|---|---|---|---|
| 2006/0100889 A1* | 5/2006 | Gosko | ............... | G06Q 30/0601 705/26.1 |
| 2014/0172724 A1* | 6/2014 | Dua | ..................... | G06Q 20/325 705/76 |
| 2014/0351033 A1* | 11/2014 | Azevedo | ............ | G06Q 30/0239 705/14.19 |
| 2021/0223093 A1* | 7/2021 | Dietz | ................. | G06K 7/10297 |
| 2024/0232884 A1* | 7/2024 | Jayaraman | ............ | H04L 63/123 |
| 2024/0395074 A1* | 11/2024 | Mateer | ................. | G06Q 10/063 |

* cited by examiner

*Primary Examiner* — Daniel St Cyr
(74) *Attorney, Agent, or Firm* — Michael A. Springs, Esq.; Shumaker, Loop & Kendrick, LLP; Patrick B. Horne

(57) ABSTRACT

A near-field communication (NFC) system for selective visual display includes a computing system, a network connection for operatively connecting devices to the computing system, a first proximity sensing terminal sending an embedded-data signal to the computing system via the network connection upon sensing a registration device by near-field communication, the signal conveying identifying data, and a primary agent device in wireless communication with the computing system via the network connection. The computing system receives the embedded-data signal, selects a stored user-entity profile associated with the identifying data, identifies a record of a timed process associated with the profile, and sends a transmittal having an indication of the timed process to the primary agent device. The primary agent device visually displays content representing the user-specific data and content representing the timed process.

18 Claims, 4 Drawing Sheets

SELECTIVE VISUAL DISPLAY BY NEAR-FIELD COMMUNICATION (NFC)

TECHNICAL FIELD

The present disclosure relates to device activations or signaling upon a device-device proximity. More particularly, the present disclosure relates to selective visual display by near-field communication.

BACKGROUND

Consumers prefer personalized experiences and are likely to continue the use of products and services when appreciation and recognition are provided. Many interactions between customers and providers of services and products occur online, where conducting transactions are typically time-efficient in relation to visits to branch offices and point-of-sale (POS) location of provider. Such visits are nonetheless in some instances needed or preferred. However, agents of providers are not always familiar at a glance with all customers and the products and services those customers use and/or require.

Traveling to a branch office and/or point-of-sale (POS) location by a customer may or may not be preceded by a tell-tale activity, such as the making of an appointment, by a customer. Even when a visit is expected, arrival times and agent availability can vary. While information about user needs may be available upon searching or inquiry by an inquisitive agent, such information is not organized in relation to equipment and human resources at a branch office and/or a point-of-sale (POS) location where and when a user has arrived.

Improvements are needed in correlating user arrival with customized reception and service practices.

SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

According to at least one embodiment, a near-field communication (NFC) system for selective visual display includes: a computing system including at least one processor and at least one of a memory device and a non-transitory storage device, wherein said at least processor executes computer-readable instructions; a network connection for operatively connecting devices to the computing system; a first proximity sensing terminal sending an embedded-data signal to the computing system via the network connection upon sensing a registration device by near-field communication, the signal conveying identifying data; and a primary agent device in wireless communication with the computing system via the network connection.

Upon execution of the computer-readable instructions, the computing system performs steps including receiving the embedded-data signal from the first proximity sensing terminal via the network connection; selecting a stored user-entity profile by identifying the stored user-entity profile as associated with the identifying data, the stored user-entity profile containing user entity specific data; identifying a record of a timed process associated with the stored user-entity profile; and sending via the network connection a transmittal comprising a portion of the user-specific data and an indication of the timed process to the primary agent device. The primary agent device visually displays first content at least representative of the portion of the user-specific data and second content at least representative of the timed process.

The primary agent device, in some examples, automatically displays the first and second content upon receiving the transmittal. In such examples the computing system at least in part controls the primary agent device, and the transmittal defines a control signal sent across the network connection, such that the transmittal advantageously triggers the primary agent device to automatically visually display first content and second content. The computing system, in such examples, generates the transmittal and configures the transmittal to trigger the primary agent device to automatically visually display first content and second content.

Upon identifying a record of a timed process as associated with the stored user-entity profile, the computing system may automatically activate a secure device.

The secure device may include a printer and the timed process may include printing an item.

The secure device may include a dispenser and the timed process may include dispensing an item.

The secure device may include a physical access controller, which can be, for example, one or more of a door and a lock box, and the timed process may include access to the door or lock box.

The primary agent device may display an identification of the secure device and a location of the secure device.

The system may include a second proximity sensing terminal sending an arrival signal to the computing system upon confirming a proximity of the registration device to a network connected apparatus, wherein the timed process includes at least one of use of and access to the network connected apparatus.

The computing system may activate the network connected apparatus upon receiving the arrival signal.

The computing system may send a confirmation signal to the primary agent device upon receiving the arrival signal.

The second proximity sensing terminal and/or the network connected apparatus may send a termination signal to the computing system upon a departure of the registration device from the second proximity sensing terminal, upon departure of the registration device from the network connected apparatus; and/or upon completion of the timed process.

The computing system may send a termination indication to the primary agent device upon receiving the termination signal.

The computing system may send an alarm to the primary agent device at a time delay after receiving the arrival signal unless the computing system receives a termination signal from at least one of the second proximity sensing terminal and the network connected apparatus upon departure of the registration device from the second proximity sensing terminal, upon departure of the registration device from the network connected apparatus, and/or upon completion of the timed process.

A video display system may be in communication with the computing system via the network connection, and the timed process may include displaying video content.

The system may further include a video conference system, and the timed process may include conducting a video conference between the video conference system and an agent device remote from the video conference system.

The system of may include a secondary agent device. Upon identifying a record of a timed process as associated with the stored user-entity profile, the computing system may automatically send an alert to the secondary agent device. The timed process may include the registration device arriving at the secondary agent device.

The first proximity sensing terminal may include a radio-frequency identification (RFID) reader and/or a near-field communication (NFC) device. The primary agent device may include a mobile device including a processor, a memory device, a non-transitory storage device, a display, and an antenna. The registration device may include a mobile device including a processor, a memory device, a non-transitory storage device, and an antenna; and/or a card or fob including an embedded integrated circuit chip and an antenna.

The system may include a secondary agent device, and upon identifying a record of a timed process associated with the stored user-entity profile, the computing system may automatically send an alert to the secondary agent device. The timed process may include the registration device arriving at the secondary agent device.

In some embodiments, upon execution of the computer-readable instructions, the computing system performs steps including, for each specific user entity of multiple user entities: receiving input event signals and storing corresponding timestamped input event records in a user-entity profile associated with the specific user entity, each of the timestamped input event records representing a respective quantized input event; incrementing, for at least some of the timestamped input event records, one or more quantized resource of the specific user entity by a respective input quantity; receiving output event signals and storing corresponding timestamped output event records in a user-entity profile associated with the specific user entity, each of the timestamped output event records representing a respective quantized output event; and decrementing, for at least some of the timestamped output event records, a respective output quantity from the one or more quantized resource of the specific user entity.

In at least one embodiment to which the above options and features apply as well, a selective visual display method is provided by a computing system upon a proximity condition, the computing system including at least one processor, at least one of a memory device and a non-transitory storage device, and a network connection operatively connecting devices to the computing system. Upon execution of the computer-readable instructions, the computing system performs steps including: receiving an embedded-data signal from a first proximity sensing terminal upon the first proximity sensing terminal sensing a registration device by near-field communication (NFC), the signal conveying identifying data; selecting a stored user-entity profile by identifying the stored user-entity profile as associated with the identifying data, the stored user-entity profile containing user entity specific data; identifying a record of a timed process associated with the stored user-entity profile; and sending via the network connection a transmittal including a portion of the user-specific data and an indication of the timed process to the primary agent device. The primary agent device visually displays first content at least representative of the portion of the user-specific data and second content at least representative of the timed process.

In at least one embodiment to which the above options and features apply as well, a non-transitory computer-readable storage medium including instructions that when executed by a processor, cause the processor to: receive an embedded-data signal via a network connection from a first proximity sensing terminal upon the first proximity sensing terminal sensing a registration device by near-field communication (NFC), the signal conveying identifying data; select a stored user-entity profile by identifying the stored user-entity profile as associated with the identifying data, the stored user-entity profile containing user entity specific data; identify a record of a timed process associated with the stored user-entity profile; and send via the network connection a transmittal including a portion of the user-specific data and an indication of the timed process to the primary agent device, wherein, the primary agent device visually displays first content at least representative of the portion of the user-specific data and second content at least representative of the timed process.

The above summary is to be understood as cumulative and inclusive. The above and below described features are to be understood as combined in whole or in part in various embodiments whether expressly described herein or implied by at least this reference. For brevity, not all features are expressly described and illustrated as combined with all other features. No combination of features shall be deemed unsupported for merely not appearing expressly in the drawings and descriptions.

BRIEF DESCRIPTION OF THE DRAWINGS

The previous summary and the following detailed descriptions are to be read in view of the drawings, which illustrate some, but not all, embodiments and features as briefly described below. The summary and detailed descriptions, however, are not limited to only those embodiments and features explicitly illustrated.

DETAILED DESCRIPTIONS

Figure 1:
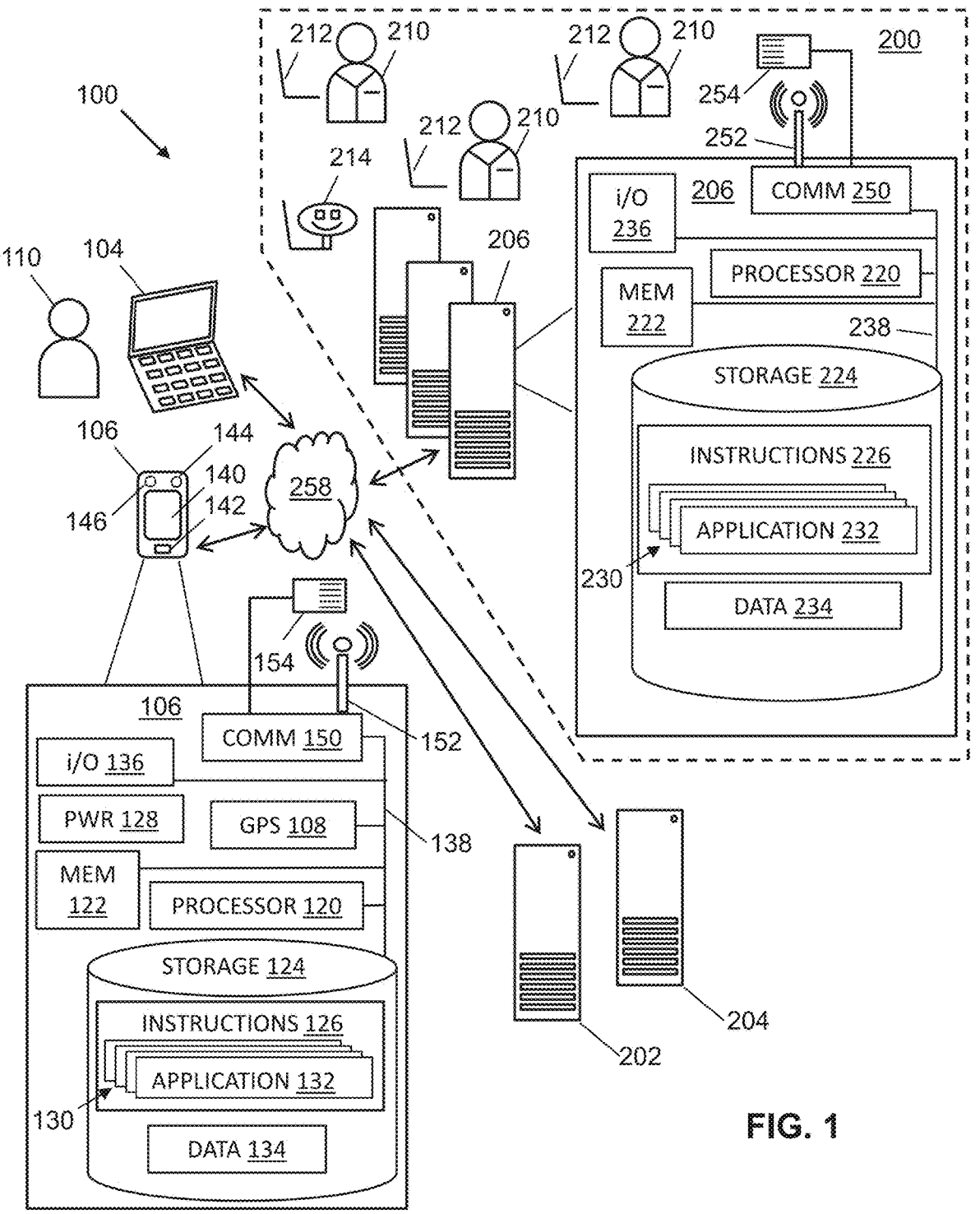
FIG. 1 illustrates an enterprise system and environment thereof, in accordance with various embodiments of the present invention.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although steps may be expressly described or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to illustrations and/or block diagrams of systems and apparatuses (the term "apparatus" includes systems and computer program products), will be understood such that each function described or implied with reference to the illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts described, illustrated, and/or implied.

These computer program instructions may also be stored in a computer-readable memory that can direct a computer or other programmable data processing apparatus to function in a particular manner, such that the instructions stored in the computer readable memory produce an article of manufacture including instructions, which implement the function/act described, illustrated, and/or implied.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts described, illustrated, and/or implied. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein. Where functions of hardware and software are described herein, related methods are detailed therewith, such that methods are disclosed as well.

FIG. 1 illustrates a system 100 and environment thereof, according to at least one embodiment, by which a user 110 benefits through use of services and products of, or those provided at least in part with use of, an enterprise system 200. The environment may include, for example, a distributed cloud computing environment (private cloud, public cloud, community cloud, and/or hybrid cloud), an on-premise environment, fog computing environment, and/or an edge computing environment. The user 110 accesses services and products by use of one or more user devices, illustrated in separate examples as a computing device 104 and a mobile device 106, which may be, as non-limiting examples, a smart phone, a tablet computer, a portable digital assistant (PDA), a pager, a mobile television, a gaming device, a laptop computer, a camera, a video recorder, an audio/video player, radio, a GPS equipped device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, at table computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which include computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, which can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wide-band (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, tablets, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met. The agent devices 212 in some implementations serve as video conference systems for audio/video conference meetings conducted between user entities 110 agents 210. In some circumstances agent devices 212 and user devices (referring to either or both of the computing device 104 and the mobile device 106) by which a video conference is conducted are remote from each other and signals thereof are transmitted and received across the network 258.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a micro-drive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, near-field communication (NFC) device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, and may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link including WiFi. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third and fourth party systems such as merchant systems configured to interact with the user device 106 during transactions and also configured to interact with the enterprise system 200 in back-end transactions clearing processes.

In certain embodiments, one or more of the systems and devices, such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

Figure 2:
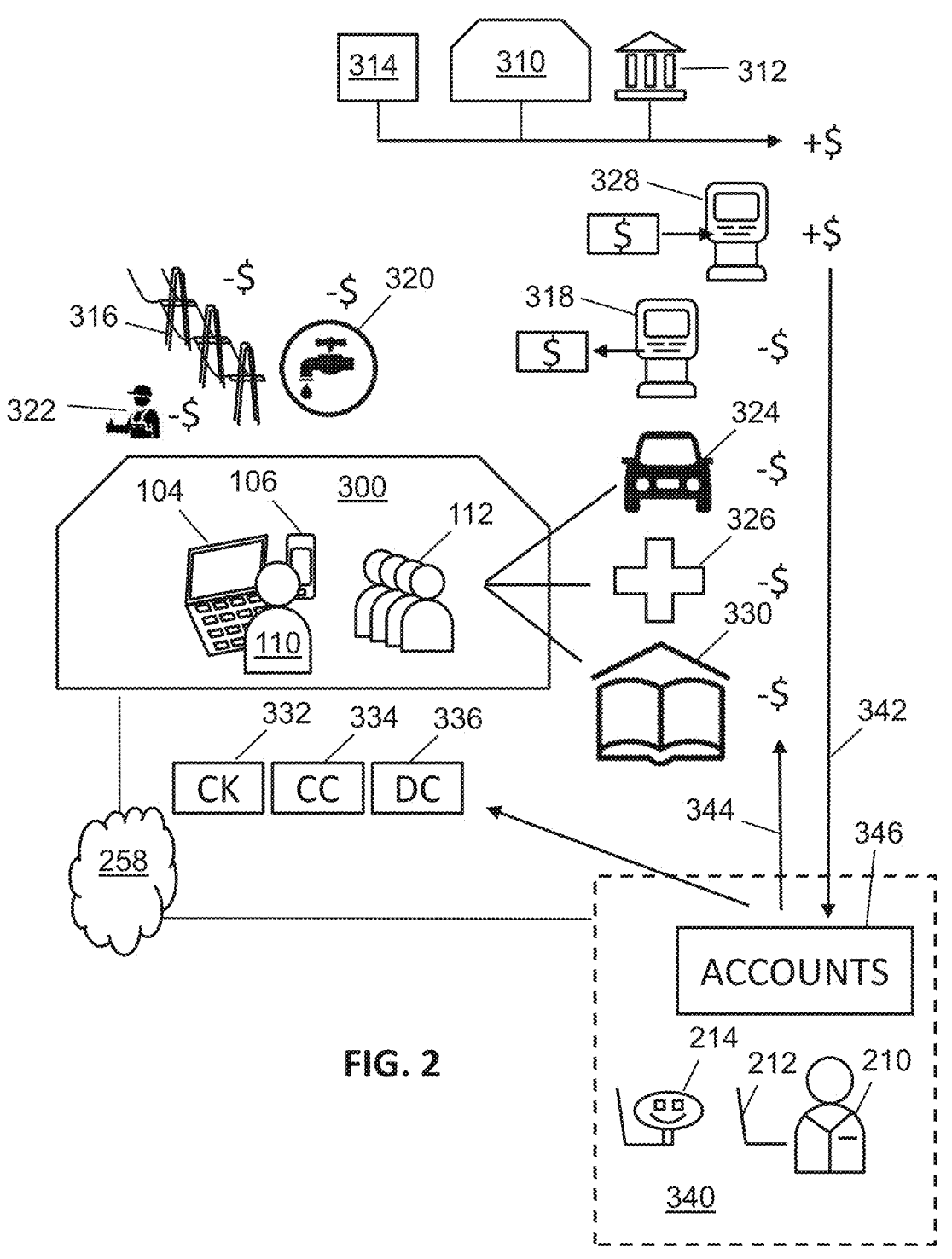
FIG. 2 represents the system of FIG. 1 in abbreviated illustration to implement transacting user entity resources in at least one mode.

FIG. 2 represents an implementation of systems and methods for at least in part transacting user entity resources. In the illustrated example, a user entity 110 can be, in non-limiting examples, a consumer, homeowner, an employee, and a group, for example that of a household or other association. The user entity 110 is illustrated as having, as managing, as being a part of, or as otherwise an interested party with regard to a household 300. The household 300 can receive any number or type of services and products. Use of "service(s)" or "product(s)" thus relates to either or both in these descriptions. With regard, for example, to online information and services, "service" and "product" are sometimes termed interchangeably.

The interests, assets, obligations, profits, and liabilities of the household 300 are those of, or are managed at least in part by, the user entity 110. Accordingly, the household 300 and user entity 110 may be termed interchangeably herein. The household 300 and/or user entity 110 has income shown generally throughout FIG. 2 with corresponding indicia (+\$), for example according to pay or other renumeration from an employer or business 310, a governmental entity 312, and other income source(s) 314 represented singly for brevity. These descriptions are not limited to any mode by which the household 300 and/or user entity 110 collects income and meets costs.

The household 300 and/or user entity 110 operates with multiple costs, shown generally throughout FIG. 2 with corresponding indicia (−\$). FIG. 2 expressly illustrates representative non-limiting costs (−\$), utilities like power 316 and water 320, maintenance and repairs 322, transportation costs 324 expenditures for dependents or other household members 112, including individual travel costs, health insurance premiums and other medical-related expenditures 326, and costs for training or education 330.

Each of these expenditures (−\$) can be paid via, for example, checks 332 drafted by the user entity, whether checks be in paper form or electronic. The expenditures can be paid by use of credit cards 334, and debit cards 336, and other payment types. These and other transactions can be conducted, for example, online using user devices, represented as a computing device 104 and a mobile device 106 in FIGS. 1 and 2.

For a household 300 and/or user entity 110, a net increase of at least available funds is understood according to the sum of fetched increments (+\$) less the sum of decrements (−\$) discharged. Use of kiosks, registers, ATMs and other POS devices and cash dispensing devices and systems, together referenced as a dispenser 318, also affect account balances as decrements (−\$) when making purchases and withdrawals. Conversely, use of kiosks, registers, ATMs and other POS devices and currency receiving devices and systems, together referenced as a device 328, affect account balances as increments (−\$).

According to systems and methods described herein, in at least some embodiments, an entity, referenced as a service entity 340 in FIG. 2, provides a service to the user entity 110 and/or household 300 by use of the enterprise system 200 (FIG. 1) and network 258. For example, by use of the computing system 206, the service entity 340 provides systems and methods for transacting user entity resources.

The service entity 340 can be described as an enterprise entity, a business entity, a retailer, a merchant entity, a financial institution, a bank, or other service and/or product provider. The service entity 340 can access client data held, acquired, and/or stored for example as described above with reference to the storage device 224 of FIG. 1 and data 234 stored therein. The service entity 340, in some examples, can also utilize available other party data that can be purchased and/or otherwise acquired, for example as described above with reference to the external systems 202 and 204 of FIG. 1.

In the non-limiting example of FIG. 2, timestamped events representing, for example, deposits 342 into and withdrawals or payments 344 made out of accounts 346 of the user entity 110 and/or household 300 are recorded. The expenditures (–$) can be described as quantized output events for which corresponding respective output quantities are decremented from one or more quantized resource of the specific user entity 110, represented by user accounts 346, to satisfy cash withdrawals and cost-related payments, referring to the satisfaction of outgoing checks, incoming debit card charges, credit card charges, and other payments made by or on behalf of the user entity 110 in covering costs.

The revenues (+$) can be described as quantized input events for which corresponding respective input quantities are fetched from sources for deposit into one or more user account(s) 346. Fetching refers to receiving and crediting cash deposits, and to the satisfaction of deposited or incoming checks from other parties, debit card charges, credit card charges, and other payments made to or exacted by the user entity 110 in receiving payments for products and/or services as non-limiting examples. Thus, a user-entity specific quantized resource, represented by the user account(s) 446, is incremented by the respective input quantity with each input event. For example, revenue (+$) from work or other transactions deposited to the one or more user account 346 represent respective quantized input events for which records are stored with regard to the accounts to which corresponding input quantities are received or fetched.

For each deposit and payment, a corresponding signal is received by some component of the enterprise system 200 indicating a respective incoming quantized input event (deposit, +$) or outgoing quantized output event (payment, –$). The signals are conveyed between user entities, for example between the user entity 110 and the service entity 340, in a bidirectional data stream, via, for example, a network connection 258. From the perspective of the system(s) 200 and/or 206, the increments and decrements made into and out of the user accounts 346 as deposits and withdrawals respectively are driven or prompted by respective incoming received signals.

Figure 3:
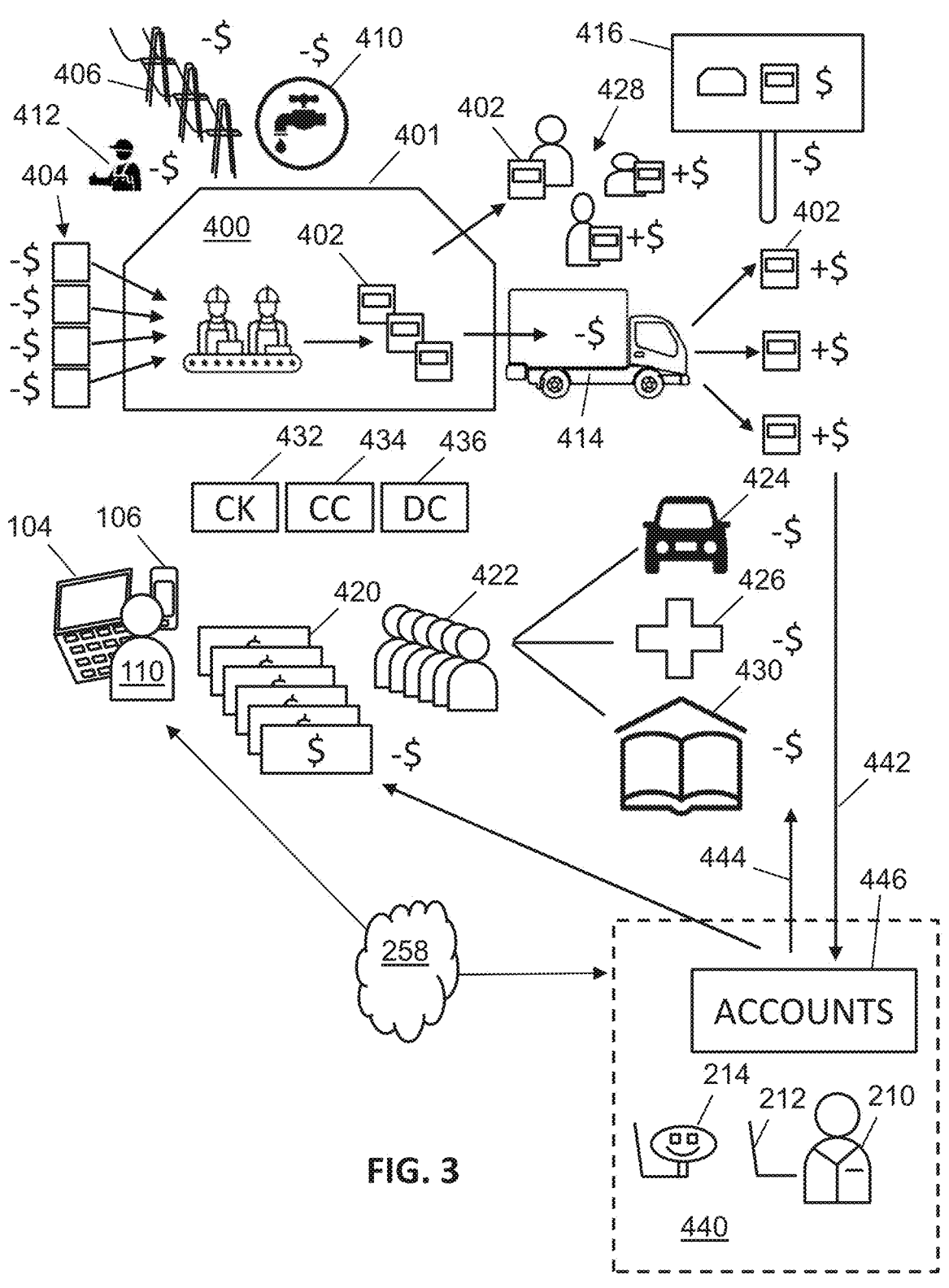
FIG. 3 represents the system of FIG. 1 in abbreviated illustration to implement transacting user entity resources in at least another mode.

FIG. 3 represents an implementation of systems and methods for at least in part transacting user entity resources. In the illustrated example, a user entity 110 can be a proprietor, employee, manager, managing group, a corporation, an office, or other interested party with regard to a business 400. The business 400 can offer any number or type of services and products. In some examples, the business 400 offers products 402 as graphically represented in FIG. 3. In other examples, the business offers services. Use of "service(s)" or "product(s)" thus relates to either or both in these descriptions.

The interests, assets, obligations, profits, and liabilities of the business 400 are those of, or are managed at least in part by, the user entity 110. Accordingly, the business 400 and user entity 110 may be termed interchangeably herein. The business 400 may have a "brick and mortar" facility 401 as illustrated in FIG. 3, denoting a business that operates one or more physical facilities where, for example, product fabrication and POS transactions (sales) with customers are conducted or services rendered. Additionally, or alternatively, all variations of which are within the scope of these descriptions, the business 400 may conduct business online, electronically, and/or virtually, in whole or in part. For example, the business may conduct order fulfillment without physically stocking and handling products and services, instead purchasing inventory as needed from another party or parties, such as a wholesaler or manufacture, to fulfill orders by shipment directly or indirectly to customers by drop shipping. In some embodiments within the scope of these descriptions, the business 400 provides services with or without exchange of physicals goods. In non-limiting examples, the business provides online services, walk-in services, downloads, streaming content, advisory services, and internet hosting and other activities. These descriptions are not limited to any mode by which the business 400 and/or user entity 110 collects income and meets costs.

The business 400 has income, for example according to sales of the product 402 and/or other products and services not necessarily graphically represented, shown generally throughout FIG. 3 with corresponding indicia (+$). Customers 428 having purchased product 402 as graphically represented in FIG. 3 can be walk-up customers making POS purchases and can be online purchasers as well, as non-limiting examples.

The business 400 operates with multiple costs, shown generally throughout FIG. 3 with corresponding indicia (–$). FIG. 3 illustrates, all representing respective costs (–$), incoming material supplies 404, utilities like power 406 and water 410, maintenance and repairs 412, transportation costs 414 with respect to product deliveries and/or transportation, advertising 416, payroll 420 for employees 422, travel reimbursements 424, health insurance premiums and other medical-related expenditures 426, and costs for training or education 430. These examples (–$) are representative, non-exhaustive, and non-limiting. Other costs may be incurred and satisfied for products and services not necessarily graphically represented.

Each of these expenditures (–$) can be paid via, for example, checks 432 drafted by the user entity, whether checks be in paper form or electronic. The expenditures can be paid by use of credit cards 434, and debit cards 436, and other payment types. These and other transactions can be conducted, for example, online using user devices, represented as a computing device 104 and a mobile device 106 in FIGS. 1 and 3. For a small business in one example, a net profit according to the sum of fetched increments (+$) less the sum of discharged decrements (–$) is essentially income for the proprietor.

According to systems and methods described herein, in at least some embodiments, an entity, referenced as a service entity 440 in FIG. 3, provides a service to the user entity 410 and/or business 400 by use of the enterprise system 200 (FIG. 1) and network 258. For example, by use of the computing system 206, the service entity 440 provides systems and methods for, at least in part, transacting user entity resources.

The service entity 440 can be described as an enterprise entity, a business entity, a retailer, a merchant entity, a financial institution, a bank, or other service and/or product provider. The service entity 440 can access client data held, acquired, and/or stored for example as described above with reference to the storage device 224 of FIG. 1 and data 234 stored therein. The service entity 440, in some examples, can also utilize available other party data that can be purchased and/or otherwise acquired, for example as described above with reference to the external systems 202 and 204 of FIG. 1.

In the non-limiting example of FIG. 3, timestamped events representing, for example, deposits 442 into and withdrawals or payments 444 made out of accounts 446 of the user entity 110 and/or business 400 are recorded. The expenditures (−$) can be described as quantized output events for which corresponding respective output quantities are decremented from one or more quantized resource of the specific user entity 110, represented by user accounts 446, to satisfy cost-related payments, referring to the satisfaction of outgoing checks, incoming debit card charges, credit card charges, and other payments made by or on behalf of the user entity 110 in covering costs.

The revenues (+$) can be described as quantized input events for which corresponding respective input quantities are fetched from sources for deposit into one or more user account(s) 446. Fetching refers to receiving and crediting cash deposits, and to the satisfaction of deposited or incoming checks from other parties, debit card charges, credit card charges, and other payments made to, deposited by, and/or exacted by the user entity 110 in receiving payments for products and/or services as non-limiting examples. Thus, a user-entity specific quantized resource, represented by the user account(s) 446, is incremented by the respective input quantity with each input event. For example, revenue (+$) from sales deposited to the one or more user account 446 represent respective quantized input events for which records are stored with regard to the accounts to which corresponding input quantities are deposited and/or fetched.

For each deposit and payment, a corresponding signal is received by some component of the enterprise system 200 indicating a respective incoming quantized input event (deposit, +$) or outgoing quantized output event (payment, −$). The signals are conveyed between user entities, for example between the user entity 110 and the service entity 440, in a bidirectional data stream, via, for example, a network connection 258. From the perspective of the system(s) 200 and/or 206, the increments and decrements made into and out of the user accounts 446 as deposits and withdrawals respectively are driven or prompted by respective incoming received signals.

The above-described benefits and advantages are provided in various embodiments of the enterprise system 200 of FIG. 1, which can be described in view of FIGS. 2-3 as conveying, receiving, sending, and monitoring quantized signals in a bidirectional data stream, and storing records thereof. The system 200 includes a computing system 206 having one or more processor 220 and at least one of a memory device 222 and a non-transitory storage device 224. The one or more processor executes computer-readable instructions 226, and a network connection 258 operatively connecting user devices 104 and 106 to the computing system. Upon execution of the computer-readable instructions, the computing system performs steps for each specific user entity 110 of multiple user entities.

The steps, in various embodiments of the system 200, include: receiving input event signals and storing corresponding input event records associated with the specific user entity, each of the input event records representing a respective quantized input event; and incrementing, for at least some of the input event records, one or more quantized resource of the specific user entity by a respective input quantity. In FIGS. 2-3, the revenues (+$) represent quantized input events for which corresponding input quantities are deposited and/or fetched from sources for deposit into one or more user account (346, 446) and for which records are stored with regard to the accounts to which the input quantities are fetched.

The steps can further include: receiving output event signals and storing corresponding output event records associated with the specific user entity, each of the output event records representing a respective quantized output event; and decrementing, for at least some of the output event records, a respective output quantity from the one or more resource of the specific user entity. In FIGS. 2-3, the expenditures (−$) represent quantized output events for which corresponding respective output quantities are discharged or decremented from one or more user account (346, 446), and for which records are stored with regard to the accounts from which corresponding output quantities are decremented.

In various system and methods according to embodiments expressly described herein and those inferred therefrom, interactions between a user entity 110 and any agent (210, 214) are monitored, recorded, summarized or data mined to create and store user profiles (350, 450, FIG. 4) for use in personalizing further communications, services, and greetings in some examples upon user arrival at a branch location of the service entity (340, 440). The records for the events as described in FIGS. 2-4, and information regarding accounts, actions, and resources for each particular user entity are kept as or associated with respective user profiles (350, 450).

The service entity can thus focus on client needs and client success in implementing client centered communication and engagement strategies. Embodiments of systems and methods described herein ethically use the large data resources 234 about user entities to create or select trustworthy recommendations and interactions that deepen client relationship in a cycle built on hyper-personalization to provide services, products, and options to users. Advanced analytics can be used to leverage machine learning and AI to optimize product offerings and provisions, and to personalize and optimize client engagement and network opportunities. Personalized content that is relevant and inspiring to client specific situations and needs can be generated and provided. Cross channel delivery, referring to coordinated communications by multiple modes and/or agents, assures the right message, right channel, and right time for clients. Such coordination can entail email, text, online chat, phone conversations, and in-person greetings, for example at branch locations. Thus managed records, represented at least by profiles 350 and profiles 450, are utilized by human agents, virtual agents, and combinations thereof.

Figure 4:
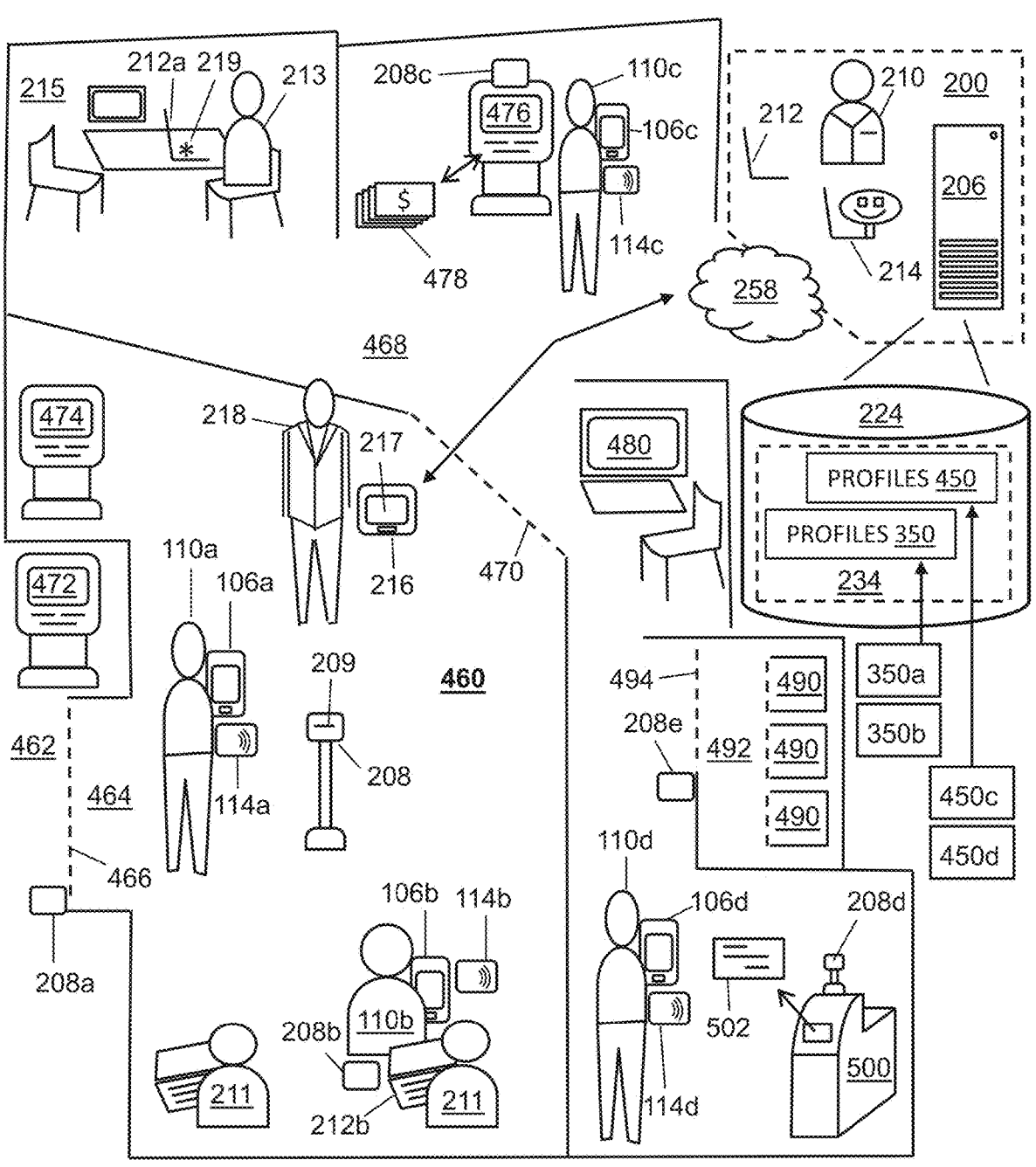
FIG. 4 represents the system of FIG. 1 in abbreviated illustration implementing systems, devices, and methods for selective visual display by near-field communication (NFC).

According to some embodiments, and with reference at least to FIG. 4, in a branch location environment, novel and advantageous systems, methods, and devices are utilized in coordination to drive personalized messaging and service offerings for a hyper-personalized user-entity experience. The service entity manages user profiles and uses collected information to guide agents in suggesting products and service needs, to guide sales and service activities, to generate and/or offer digital interaction, in-property interaction, and sales interaction.

Interactions that are recorded in whole or in part for personalization of upcoming interactions include online sessions, email, automated or semi-automated sent physical mail, and in-property interactions, which can include visits to ATMs and branch locations, sales interactions, and call center interactions, as non-limiting and non-exhaustive examples. These interactions are subject to data integration and processes to or by which analytics applied for pertinent information dissemination to agents is conducted.

The data integration may trigger events such as real time personalized offers of service and assistance during a branch visit by providing insightful information to branch-location agents guiding interactions with both human agents and automated digital interactions. Advisory messaging can be directed to users via human agents and/or virtual agents.

In FIG. 4 diagrammatically facility 460 represents a branch office and/or point-of-sale (POS) location of a service entity, for example as described above with reference to the service entity 340 and/or the service entity 440, which can be the same service entity. The computing system 206 maintains and stores profiles respectively associated with user entities. User profiles 350 (FIG. 4) represent those of non-business user entities 110 within the scope of the descriptions of FIG. 2. User profiles 450 represent those of business user entities 110 within the scope of the descriptions of FIG. 3.

The facility 460 is illustrated as having on-site provisions including one or more automatic teller machine (ATM). An exterior ATM 472, for example at an exterior walk-up or drive-up location, and a lobby area interior ATM 474 are shown in FIG. 4 representing any number of such devices.

A dispenser 476 in a secure area 468 of the facility interior 464 is used to deposit or withdraw items 478 represented as currency as a non-limiting example. For example, higher amounts or value of currency than permitted using the exterior ATM 472 and interior ATM 474 may can be deposited or withdrawn using the dispenser 476 and/or specially requested denominations and currencies may be transacted. The items 478 in other non-limiting and non-exhaustive examples, can be documents, checks, banking cards, fobs, identification cards, and registration devices as described in the following. A pre-arranged pick-up time or schedule may be established at a time process to arrange for a particular user entity 110c to utilize the dispenser 476. The dispenser 476 can be a secure area ATM as illustrated, or can be, in non-limiting examples, a box, a bin, a locker, a bag, and a drawer. A security door 470 in the illustrated facility separates the secure area 468 from the remainder of the facility interior 464.

In some examples, agents 210 (FIGS. 1-4) are remote from the facility 460 and may interact with user entities via video conference systems 480 within the facility 460, each of which can also be in a private space such as a meeting room or sub-office within the facility.

Lock deposit boxes 490 for securing user-entity items may be within the facility 460, for example in a second secure and private area 492, illustrated within the first secure area 468 of the facility interior 464. A door 494 is shown as sequestering the secure and private area 492 from the remainder of the interior of the facility.

A printer 500 is shown in a secure area 468 of the facility interior 464 for use by agents and/or user entities. The printer 500 is used to prepare printed items 502, representing as non-limiting and non-exhaustive examples, printed checks for personal and business accounts, counter checks, and other documents.

Multiple agents 211, and 213, illustrated as on-site to provide services to user entities, are otherwise within the scope of the prior descriptions made with reference to agents 210 in FIG. 1. In the illustrated example, the agents 211 represent banking tellers in at least one example within the scope of FIG. 4. One or more special service agent 213 are on-site, for example each in a private space 215 such as a meeting room or sub-office, representing in non-limiting examples bankers and/or advisors for advanced services such as opening accounts, amending terms of contracts, mortgage services, lending services, investment services, and financial advisory services. Provisions with regard both to equipment and agents that are shown at least once expressly in FIG. 4 and/or that are described at least once herein represent their kind in any number.

Multiple users (110a, 110b, 110c, 110d) are illustrated in FIG. 4, representing examples each according to descriptions above with reference to the user entity 110. The user 110a utilizes one or more user device 106a, referring to either or both of the computing device 104 and the mobile device 106 (FIG. 1) as previously described unless otherwise specified. Other respective user devices (106b, 106c, 106d) are shown among the other users (110b, 110c, 110d) in FIG. 4, for which the device 106 serves for brevity as a singly described example with reference to FIG. 1. The user 110a utilizes one or more registration device 114a by which arrival of the user 110a in possession of the registration device 114a is sensed by a proximity sensing terminal 208 in communication with the computing system 206, for example via network 258, enabling the computing system to send communications and control signals to devices and systems within and/or at the facility 460 responsively to the registration device engaging the proximity sensing terminal 208. Where the network 258 is referenced in descriptions of FIG. 4, any local wireless links such as facility Wi-Fi and/or any facility specific communications equipment and/or hard wire connections are included, as well as internet connections to systems and devices local to and remote from the facility 460.

The registration device 114a, in non-limiting and non-exhaustive examples, can be a card device and/or fob device including an embedded integrated circuit chip and an antenna, and a mobile device including a processor, a memory device, a non-transitory storage device, and an antenna for example within the scope of the descriptions of user device 106. Other respective registration devices (114b, 114c, 114d) are shown among the other users (110b, 110c, 110d). For brevity, the descriptions herein of the registration device 114a apply as well to the registration devices (114b, 114c, 114d). Where use of the registration device 114a is described herein, that use may be provided by the user device 106a in lieu of or in combination with the registration device 114a.

The registration device 114a may accordingly be characterized as a field-enabled card and/or a frequency-operated button (fob), a key fob, a credit card, a debit card, a smart card, a smartphone and/or another mobile device using radio-frequency identification (RFID) or near-field communication (NFC). The registration device 114a in some examples applies tokenization in which user and/or issuer details are encapsulated within data accessible to and/or accessed by a software application or other processor executed code. In some embodiments, the registration device 114a and the user device 106a are the same device and/or the registration device 114a is onboard the user device 106a, such that reference to either one refers as well to the other.

The proximity sensing terminal 208, in non-limiting and non-exhaustive examples, can be characterized as at least one of a radio-frequency identification (RFID) reader and a near-field communication (NFC) reader. Thus, the terminal 208 can be used for contact free or tap contact engagement and registration of various devices such field-enabled cards, fobs, credit cards, debit cards, smart cards, and other devices, including smartphones and other mobile devices using radio-frequency identification (RFID) or near-field communication (NFC). The user entity 110a engages the registration device 114a with the terminal 208 for interaction therebetween by physical proximity of the device 114a and terminal 208. These descriptions include such contact free and/or tap type engagement and insertion type engagements as well for such examples in which the registration device is inserted into a slot 209 of the proximity sensing terminal 208. For brevity, the descriptions herein of the proximity sensing terminal 208 apply as well to other proximity sensing terminals (208a, 208b, 208c, 208d, 208c) in FIG. 4, the uses of which are separately described with reference to the respective location and dedicated use of each at or within the facility 460 and its role in the system 200.

As the user entity 110a engages the proximity sensing terminal 208 with the registration device 114a by proximity, contact, or insertion, the terminal 208 retrieves and/or receives identifying data to identify the registration device 114a and/or stored user profiles 350a unique to the particular user entity 110a. The proximity sensing terminal 208 sends an embedded-data signal to the computing system 206 upon sensing the registration device 110a, the signal conveying identifying data by which a profile to which the particular registration device is associated can be identified.

The computing system uses the identifying data to select and access a particular stored user-entity profile 350a from multiple user-entity profiles 350. The particular user-entity profile 350a selected for access in association with the user entity 110a engaging the proximity sensing terminal 208 with the registration device 114a is identified by association with the identifying data. The stored user-entity profile 350a contains user entity specific data as described above with reference at least to FIGS. 2-3 and profiles 350 and 450.

With or without express illustration, for each user entity (110c, 110d) a particular user profile is included in the user profiles 350. Similarly, without or without express illustration of a respective user entity, each user-entity profile (450a, 450b), corresponds to a particular user entity.

According to the function and role of each proximity sensing terminal (208, 208a, 208b, 208c, 208d, 208e) the computer system receives identifying data upon a registration device engaging the terminal, and the computing system identifies the resources, authorities, access rights and/or privileges granted to the particular use entity 110a as indicated in the stored user profile 350a. The computing system is enabled, for example by use of network 258 and/or any facility specific communications equipment and/or hard wire connections, to signal, activate, and/or control various devices and systems associated with the proximity sensing terminal, according to the role of the proximity sensing terminal.

The respective user profiles 350a and 350b of the user entities 110a and 110b may have different levels of resources, authorities, access, and/or privileges, such that the reception, service, and or access granted to the user entities may vary.

The various devices and systems the computing system 206 is enabled to signal, activate, and/or control include multiple types of secure devices, including physical access controllers such as electrically and/or electronically locking doors, such as the lobby door 466 controlling access from the exterior 462 of the facility 460 to the interior thereof. A dedicated proximity sensing terminal 208a at the lobby door is illustrated for enabling the computer system to activate the door upon sensing a registration device at the terminal 208a for user entities allowed access according to their profiles as identified and accessed by way of their registration devices (114a, 114b, 114c, 114d) engaging the terminal 208a at their arrival to the facility.

Advantageously, the system 200 includes a primary agent device 216, for example carried by a primary agent 218.

While additional features and benefits of the primary agent device 216 are described herein, the primary agent device 216 serves the primary agent 218 at least in some capacity as the agent devices 212 serve the agents 210. Thus descriptions herein of the agent devices 212 apply to the primary agent device 216 as well. In at least one embodiment well suited for implementation of devices, methods and systems described particularly herein, the primary agent device 216 is a mobile tablet computer with processing and communication capabilities. Other exemplary devices characterized as smart phones and other portable computing devices can serve as well as the primary agent device 216.

The primary agent device 216 present in the facility 460 enables very personalized receptions, greetings, services and guidance to user entities by empowering the primary agent 218 with the knowledge database represented at least in part by the stored profiles (350, 450) and other information and content available as the primary agent travels within the facility to interact with user entities.

The primary agent device 216 is in at least wireless communication with the computing system 206, for example via the network 258. When the proximity sensing terminal 208 sends the embedded-data signal to the computing system 206 upon sensing the registration device 110a, and identifying data corresponds to a particular stored user-entity profile 350a, the computing system 206 sends user-specific data to the primary agent device 216 for display at least in part thereby informing the primary agent 218 of the arrival and/or presence of at least the registration device 114a and presumably the user entity 110a with whom the particularly registration device 114a is associated according to the profile 350a. The primary agent 218 is thus enabled by information to greet and assist the user entity 110a in a customized way, having user profile information at hand by way of the primary agent device 216.

In various embodiments, the primary agent device 216 plays a pivotal role within and is a component of a system near-field communication (NFC) system for selective visual display, for example upon a proximity condition. In such embodiments, the computing system 206, when prompted by receiving of the embedded-data signal from the proximity sensing terminal 208, selects a stored user-entity profile by identifying the stored user-entity profile as associated with the identifying data. The stored user-entity profile contains user entity specific data. The computing system determines whether a record of a timed process associated with the stored user-entity profile.

In some examples, a timed process refers to a pre-arranged appointment and/or a scheduled visit for use. For example, an appointment or schedule visit for use of a secure device can be set online by a user entity prior to a visit to the facility, and/or can be set by communication with any herein-referenced agent by voice, text, email, and other communication modes. Setting an appointment and/or a scheduling a visit and/or use of a secure device is entered into the profile (350, 450) of the particular user entity as a record of a timed process. A record of a timed process can be entered into a user-entity profile (350, 450) prior to presence of a user entity at the facility 460, or upon arrival or other moment when present. A record of a timed process can be entered into a user-entity profile (350, 450) by any and all of the referenced agents (216, 210, 211, 213) using their respective agent devices.

A timed process relating to access and/or use of a secure device refers, in non-limiting and non-exhaustive examples, to physical access controllers with reference at least to each of door 466, door 470, door 494, and deposit boxes 490 each which in some embodiments are individually locked and electronically controlled at least in part. Secure device refers as well to other system components including at least dispenser 476 and printer 500. In further non-limiting and non-exhaustive examples, a timed process refers to use of a video conference system 480, a service to be provided by an agent 211, an agent 213, an offsite human agent 210, a virtual agent 214, and the primary agent 216.

When the computing system determines whether a record of a timed process is associated with the stored user-entity profile, the computing system sends, via the network connection, a transmittal comprising a portion of the user-specific data and an indication of the timed process to the primary agent device. The primary agent device 216 visually displays first content at least representative of the portion of the user-specific data and second content at least representative of the timed process. The first and second content are together represented as content 217 displayed on the primary agent device 216 in FIG. 4. This enables the primary agent to greet and assist the user entity 110a in a customized way.

The portion of the user-specific data sent to the primary agent device 216 can include an access event record indicating any failure or fulfillment of any transaction, application, service or product in use by and/or of interest to the particular user entity, thereby alerting the primary agent 218 by way at least of the content 217 displayed as to what assistance should be provided a user entity. The content 217 is displayed automatically in some embodiments upon receipt by the primary agent device 216 of the data including the portion of the user-specific data sent by the computing device 206.

The displayed content 217 includes, in non-limiting and non-exhaustive examples, information identifying the user entity, a digital image of the user entity, account information about the user entity, services and products of the service entity (340, 440) used by or accessible to the user entity, and one or more record of communication between user entity and the service entity (340, 440) and/or any agent thereof. The displayed content 217 includes, in non-limiting and non-exhaustive examples, indications of levels of resources, authorities, access, and/or privileges permitted the user entity by the service entity (340, 440). The reception, service, and or access granted to the user entities may accordingly vary by actions of the primary agent 216.

The content 217 displayed in some embodiments includes an offer of optional content regarding services and products available to the user entity 110 at the facility 460. For example, the primary agent 218 by use of the content 217 displayed by the primary agent device 216 can offer customized advisory assistance for advanced services by way of an in-person conference with a special agent 213 at an available conference location 215. Upon acceptance of the conference, the primary agent 216 may guide or direct the user entity to the location 215, for example by display of the location 215 on the primary agent device 214 or by the computer system 206 sending the location 215 to the registration device 114a and/or user device 106a.

A conference or other meeting held between the agent 213 and user entity 110a may be arranged by a timed process for which a record was made at arrival or a prior time. In some embodiments of systems and methods within the scope of these descriptions, upon identifying a record of a timed process associated with the stored user-entity profile, the computing system 206 automatically sends an alert 219 to a secondary agent device 212a, for example utilized by the agent 213. The timed process in such an example is one in which the registration device 114a and/or user device 106a arrives at the secondary agent device 212a. The alert 219 informs the agent 213 of an upcoming conference. Further content from the user-entity profile 350a may be automatically sent by the computing system 206 to the secondary agent device 212a and displayed by the secondary agent device 212a, including, in non-limiting and non-exhaustive examples, information identifying the user entity, a digital image of the user entity, account information about the user entity, services and products of the service entity (340, 440) used by or accessible to the user entity, and one or more record of communication between user entity and the service entity (340, 440) and/or any agent thereof. This prepares the agent 213 for upcoming timed process with the user entity 110a.

Once interaction has begun by engagement of the proximity sensing terminal 208 by the registration device 114a or user device 106a serving as the registration device, interaction may continue in various embodiments via another user computing device associated with the identifying data by which the stored user-entity profile 350a of the user entity 110a is identified. For example, the content 217 displayed by the primary agent device 216 may be an offer of a timed process such as video conferencing to be scheduled during an interaction at the facility 460, and then later conducted when the user entity 110a is at another location such as the facility 401 or the household 300 and by use a user device 104.

The content 217 displayed by the primary agent device 216 may include an offer of a timed process such being presented audio/video content, for example by use of an on-site video conference system 480. The content 217 displayed by the primary agent device 216 may include an offer of a timed process such as video conferencing at the facility 460, for example between the user entity and an agent remote from the facility 460. Upon acceptance of the video conference, the primary agent 216 may guide or direct the user entity to the video conference system 480, for example by display of the location of the video conference system 480 or by the computer system 206 sending the location of the video conference system 480 to the registration device 114a and/or user device 106a. A timed process can include conducting a video conference between the video conference system 480 and an agent device 212 remote from the facility 460 and/or the video conference system 480.

Whether one or more agents 213 and one or more video conference systems 480 are on-site at the facility 460, walk-in customers with and without appointments can be invited to enjoy and benefit from in-person or remote conferences, and each user entity 110 can be engaged by content related to services and products within their respective interests.

Use of the above-described provisions at the facility 460 may be offered by the primary agent 216 and/or requested impromptu on-site or as a timed process arranged prior to arrival by the user entity 110a using one or more of the registration device 114a and user devices (106a, 104). In one such example, a timed process of the user 110b includes requested and/or scheduled teller service and the user entity 110b is guided by the primary agent 216 to an agent 211 for bank teller services in a non-limiting example. As the user entity 110b engages the proximity sensing terminal 208b with the registration device 114b by proximity, contact, or insertion, the terminal 208b retrieves and/or receives identifying data to identify the registration device 114b and/or stored user profiles 350b unique to the particular user entity 110b.

The proximity sensing terminal 208*b* sends an embedded-data signal to the computing system 206 upon sensing the registration device 110*b*, the signal conveying identifying data by which the profile 350*b* to which the particular registration device 114*b* is associated can be identified. The computing system 206 uses the identifying data to identify and access the particular stored user-entity profile 350*b* associated with the identifying data and user entity 110*b*. The stored user-entity profile 350*b* contains user entity specific data as described above with reference at least to FIGS. 2-3 and profiles 350 and 450. The computing system 206 sends a portion of the user-specific data to the agent device 212*b* associated particularly with the proximity sensing terminal 208*b*, enabling customized services, greetings, and treatment by the agent 211.

In another example, a timed process of the user 110*d* includes requested and/or scheduled use of the dispenser 476, and the user 110*d* requests and/or has scheduled use of the printer 500. In another example, the primary agent 216 and/or the computing system 206 regulate(s) the security door 470 and entry therethrough of user entities to the secure area 468 of the facility interior 464. The computing system, for each specific user entity of multiple user entities, stores access event records in the user-entity profile (350) associated with the specific user entity, each of the access event records corresponding to access of devices, areas, and/or content by the user entity, a user device and/or registration device associated with the specific user entity.

In some embodiments, the computing system 206 automates or semi-automates operations of and accesses to secure devices, referring to physical access controllers with reference at least to each of door 466, door 470, door 494, and deposit boxes 490 each which in some embodiments are individually locked and electronically controlled at least in part. Secure device refers as well to other system components including at least dispenser 476, printer 500, and agent device 212*b* serving in some examples as a cash drawer and thereby as a physical access controller example of a secure device with respect to currency contents.

In some embodiments, the primary agent 218, through operation of the primary agent device 216, coordinates activation of the secure devices with arrival by and authorization of a user entity. For example, upon determining that a particular user has authority and/or an appointment documented as a record of a timed process to use one or more such secure device by way of review of the content 217, the primary agent 218 may apply input to the primary agent device 216, thus prompting a communication to the computing system 206 by the device 216 and triggering by the applied input the computing system to activate the one or more secure device.

The secure device in some examples is a printer 500 and activating the secure device includes authorizing and/or initiating printing one or more item 502. The secure device in some examples is a dispenser 476 and activating the secure device comprises authorizing and/or initiating dispensing one or more item 478. The secure device in various examples includes a door (466, 470, 494) and/or a box 490, and activating the secure device includes opening, unlocking, closing, and locking the door and/or box.

The primary agent 216 may guide or direct the user entity to a secure device, for example by display of the location of secure device or by the computer system 206 sending the location of the secure device to the registration device 114*a* and/or user device 106*a*.

Access and use of a secure device in some embodiments requires a record of a timed process. A timed process may have a time window of viability and authorization defined as a time interval between an initiation and a termination time. The time interval may be pre-defined in the record of the time process and defined at the time an appointment or schedule is set. The time interval or time duration may be set upon arrival and access request by a user entity without an appointment or scheduled visit. For example, a timed process may be initiated through use of the primary agent device 216 upon input by the primary agent 218, prompting a creation or entry of a record of the timed process into the profile (350, 450) of the particular user entity.

Whether or not pre-arranged, the record of the timed process in some embodiments prompts the computing system 206 to automatically activate the one or more secure device indicated by the record and/or selected and/or requested by the user entity. In some embodiments, a respective proximity sensing terminal regulates access and use of secure devices, for example in combination with their activation as already described. In the illustrated embodiment of the facility illustrated in FIG. 4, each referenced secure device (466, 212*b*, 476, 494, 500) is equipped and regulated by a dedicated respective proximity sensing terminal (208*a*, 208*b*, 208*c*, 208*e*, 208*d*). In at least one embodiment of the facility 460 and system 200, each such referenced secure device is regulated by its dedicated proximity sensor, such that use thereof requires engagement of the respective terminal by an agent device, a registration device, and/or a user device.

For exemplary descriptions sufficient to describe others, upon the user entity 110*c* arrival at the dispenser 476, the user entity engages the proximity sensing terminal 208*c* dedicated respectively to the dispenser 476 with the registration device 114*c* and/or user device 106*c*. The terminal 208*c* sends an arrival signal to the computing system 206 triggering the computing system 206 to confirm authorization and use of the dispenser 476 by the particular user entity. For example, the computing may review the profile of the user entity 110*c* to determine authorization of use such as checking account balances and/or confirming whether there is a corresponding record of a timed process as previously described. Once authorization is confirmed, the computing system 206 permits use of the dispenser 476 by the user entity 110*c*.

Upon identifying a record of a timed process associated with the stored user-entity profile, the computing system automatically activates a secure device. In various examples, the activated secure device can be a printer 500, and the timed process can include printing an item 502. The activated secure device can be a dispenser 476 and the timed process can include dispensing an item 478. The activated secure device can be a physical access controller as exemplified and described herein with reference at least to a door and a lock box and the timed process includes access to or opening of the door or lock box.

Each referenced dedicated proximity sensing terminal (208*a*, 208*b*, 208*c*, 208*d*), in at least one embodiment of the facility 460 and system 200, sends an arrival signal to the computing system upon confirming a proximity of a registration device (114*a*, 114*b*, 114*c*, 114*d*) to its respective network connected apparatus, with reference to, for example, the secure device s (466, 212*b*, 476, 494, 500), and if a record of a timed process is found in respective user-entity profile, the computing system activates and/or permits use of and/or access to the network connected apparatus upon receiving the arrival signal. The computing system 206 also sends a confirmation signal to the primary agent device 216 upon receiving the arrival signal. This informs the primary agent 218 of initiation and progress of user entities within the facility with respect to their timed processes, empowering the primary agent 218 to usher activities of multiple on-site user entities.

Each dedicated proximity sensing terminal (208a, 208b, 208c, 208c, 208d) and/or its associated network connected apparatus (466, 212b, 476, 494, 500) sends a termination signal to the computing system upon at least one of: departure of the registration device from the dedicated proximity sensing terminal; departure of the registration device from the network connected apparatus; and completion of the timed process. The computing system 206 sends a termination indication to the primary agent device upon receiving the termination signal. This informs the primary agent 218 of the departure and/or completion, for example by way of content 217 displayed, for example automatically, by the primary agent device 216 upon receiving the termination indication.

In some embodiments, the computing system 206 sends an alarm to the primary agent device 216 at a time delay after receiving the arrival signal unless the computing system 206 receives the termination signal. This informs the primary agent 218 for example of any over-extended time process, delayed completion, and/or a user entity in need of assistance, for example by way of an alarm referring to content 217 displayed, for example automatically, by the primary agent device 216 upon receiving the alarm.

The above-described features of the computing system 206 and other components of the system 200, when operatively performing as described above, together define various embodiments of systems and corresponding methods for selective visual display by near-field communication (NFC).

These such systems and methods are distinguished over what can be feasibly accomplished by, for examples, manual action by system administrators assisting agents and users due at least to the unpredictability of user arrivals and what timed process they may each request and/or accept. Any given user may arrive at any given facility and provided a customized reception enabled by the primary agent device utilizing user profile data retrieved in real time as the user entity arrival is established by use of proximity sensing devices. Multiple services can be concurrently conducted by the computing system 206 via multiple agent devices and reference secure devices for walk-in customers with and without appointments documented as timed processes and be engaged by content related to services and products within their respective interests, for example according to information in their respective profiles. Only modern processors can feasibly coordinate the possible peak data flow of the above-described activities when dozens and even hundreds of device actions and thousands of user arrivals are occurring concurrently across multiple facilities.

The primary agent device 216, in some embodiments described at least in part in the preceding, automatically displays content 217 upon receiving the described transmittal from the computing system 206. In such examples the computing system at least in part operatively controls the primary agent device from across a network connection, and the transmittal defines a control signal sent across the network connection, such that the transmittal advantageously triggers the primary agent device to automatically visually display the referenced content 217. The computing system, in such examples, generates the transmittal and configures the transmittal to trigger the primary agent device to automatically visually display first content and second content.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A near-field communication (NFC) system for selective visual display, the system comprising:

a computing system comprising at least one processor and at least one of a memory device and a non-transitory storage device, wherein said at least processor is configured to execute computer-readable instructions;

a network connection operatively connecting devices to the computing system;

a first proximity sensing terminal configured to send an embedded-data signal to the computing system via the network connection upon sensing a registration device by near-field communication, the signal conveying identifying data; and a primary agent device in wireless communication with the computing system via the network connection; and a secondary agent device in wireless communication with the computing system via the network connection, wherein, upon execution of the computer-readable instructions by said at least one processor, the computing system is configured to:

receive the embedded-data signal from the first proximity sensing terminal via the network connection;

select a stored user-entity profile by identifying the stored user-entity profile as associated with the identifying data, the stored user-entity profile containing user entity specific data;

identify a record of a timed process associated with the stored user-entity profile; and send via the network connection a transmittal comprising a portion of the user-specific data and an indication of the timed process to the primary agent device, wherein, the primary agent device is configured to visually display first content at least representative of the portion of the user-specific data and second content at least representative of the timed process, and wherein the timed process comprises the registration device arriving at the secondary agent device and upon identifying the record of the timed process associated with the stored user-entity profile, the computing system is configured to automatically send an alert to the secondary agent device.

2. The system of claim 1, wherein the computing system is configured to automatically activate a secure device upon identifying a record of a timed process associated with the stored user-entity profile.

3. The system of claim 2, wherein the secure device comprises a printer and the timed process comprises printing an item.

4. The system of claim 2, wherein the secure device comprises a dispenser and the timed process comprises dispensing an item.

5. The system of claim 2, wherein the secure device comprises a physical access controller.

6. The system of claim 5, wherein the physical access controller comprises at least one of a door and a lock box and the timed process comprises access to the door or lock box.

7. The system of claim 2, wherein, the primary agent device is configured to display at least one of an identification of the secure device and a location of the secure device.

8. The system of claim 1, further comprising a second proximity sensing terminal configured to send an arrival signal to the computing system upon confirming a proximity of the registration device to a network connected apparatus, wherein the timed process comprises at least one of use of and access to the network connected apparatus.

9. The system of claim 8, wherein the computing system is configured to activate the network connected apparatus upon receiving the arrival signal.

10. The system of claim 9, wherein the computing system is configured to send a confirmation signal to the primary agent device upon receiving the arrival signal.

11. The system of claim 10, wherein at least one of the second proximity sensing terminal and the network connected apparatus is configured to send a termination signal to the computing system upon at least one of:

departure of the registration device from the second proximity sensing terminal;

departure of the registration device from the network connected apparatus; and completion of the timed process.

12. The system of claim 11, wherein the computing system is configured to send a termination indication to the primary agent device upon receiving the termination signal.

13. The system of claim 9, wherein the computing system is configured to send an alarm to the primary agent device at a time delay after receiving the arrival signal unless the computing system receives a termination signal from at least one of the second proximity sensing terminal and the network connected apparatus upon at least one of:

departure of the registration device from the second proximity sensing terminal;

departure of the registration device from the network connected apparatus; and completion of the timed process.

14. The system of claim 1, further comprising a video display system in communication with the computing system via the network connection, wherein the timed process comprises a displaying video content.

15. The system of claim 1, further comprising a video conference system, wherein the timed process comprises conducting a video conference between the video conference system and an agent device remote from the video conference system.

16. The system of claim 1, wherein the first proximity sensing terminal comprises at least one of a radio-frequency identification (RFID) reader and a near-field communication (NFC) device;

the primary agent device comprises a mobile device including a processor, a memory device, a non-transitory storage device, a display, and an antenna; and the registration device comprises at least one:

a mobile device including a processor, a memory device, a non-transitory storage device, and an antenna; and a card or fob including an embedded integrated circuit chip and an antenna.

17. A method for selective visual display by a computing system across a network connection, the computing system comprising at least one processor and at least one of a memory device, a non-transitory storage device, and a network connection operatively connecting at least a primary agent device and a secondary agent device to the computing system, wherein, upon execution of the computer-readable instructions, the computing system performs steps comprising:

receiving an embedded-data signal from a first proximity sensing terminal upon the first proximity sensing terminal sensing a registration device by near-field communication (NFC), the signal conveying identifying data;

selecting a stored user-entity profile by identifying the stored user-entity profile as associated with the identifying data, the stored user-entity profile containing user entity specific data;

identifying a record of a timed process associated with the stored user-entity profile; and sending via the network connection a transmittal comprising a portion of the user-specific data and an indication of the timed process to the primary agent device, wherein, the primary agent device visually displays first content at least representative of the portion of the user-specific data and second content at least representative of the timed process, and wherein the timed process comprises the registration device arriving at the secondary agent device, and upon identifying the record of the timed process associated with the stored user-entity profile, the computing system is configured to automatically send an alert to the secondary agent device.

18. A non-transitory computer-readable storage medium, the computer-readable storage medium including instructions that when executed by a processor, cause the processor to:

receive an embedded-data signal via a network connection from a first proximity sensing terminal upon the first proximity sensing terminal sensing a registration device by near-field communication (NFC), the signal conveying identifying data;

select a stored user-entity profile by identifying the stored user-entity profile as associated with the identifying data, the stored user-entity profile containing user entity specific data;

identify a record of a timed process associated with the stored user-entity profile; and send via the network connection a transmittal comprising a portion of the user-specific data and an indication of the timed process to a primary agent device, wherein, the primary agent device visually displays first content at least representative of the portion of the user-specific data and second content at least representative of the timed process, wherein the timed process comprises the registration device arriving at a secondary agent device, and upon identifying the record of the timed process associated with the stored user-entity profile, the computing system is configured to automatically send an alert to the secondary agent device.

* * * * *